United States Patent
Norwood et al.

(10) Patent No.: US 10,686,396 B2
(45) Date of Patent: Jun. 16, 2020

(54) MIXING DEVICE POWER SYSTEM AND METHOD

(71) Applicants: John D. Norwood, Houston, TX (US);
Doanh Ba Ho, Houston, TX (US);
Adam G. Olson, Houston, TX (US)

(72) Inventors: John D. Norwood, Houston, TX (US);
Doanh Ba Ho, Houston, TX (US);
Adam G. Olson, Houston, TX (US)

(73) Assignee: OFI Testing Equipment, Inc., Houston, TX (US)

( * ) Notice: Subject to any disclaimer, the term of this patent is extended or adjusted under 35 U.S.C. 154(b) by 0 days.

(21) Appl. No.: 16/246,743

(22) Filed: Jan. 14, 2019

(65) Prior Publication Data

US 2019/0222157 A1    Jul. 18, 2019

Related U.S. Application Data

(60) Provisional application No. 62/618,798, filed on Jan. 18, 2018.

(51) Int. Cl.
| | |
|---|---|
| *H02P 27/04* | (2016.01) |
| *H02P 25/04* | (2006.01) |
| *B01F 15/00* | (2006.01) |
| *B01F 13/10* | (2006.01) |
| *B01F 7/16* | (2006.01) |
| *E21B 21/06* | (2006.01) |

(52) U.S. Cl.
CPC .......... *H02P 27/04* (2013.01); *B01F 7/1665* (2013.01); *B01F 13/1022* (2013.01); *B01F 15/00461* (2013.01); *B01F 15/00474* (2013.01); *B01F 15/00538* (2013.01); *H02P 25/04* (2013.01); *B01F 2215/0081* (2013.01); *E21B 21/062* (2013.01)

(58) Field of Classification Search
CPC .................. H02P 27/04; H02P 25/04
USPC .......................... 318/807, 767, 727
See application file for complete search history.

(56) References Cited

U.S. PATENT DOCUMENTS

| | | | | |
|---|---|---|---|---|
| 5,611,619 | A * | 3/1997 | Shen .................. | B01F 7/00208 366/244 |
| 6,339,309 | B1 * | 1/2002 | Bixel ..................... | H02P 1/24 318/727 |
| 6,414,860 | B1 | 7/2002 | Li | |
| 6,710,573 | B2 * | 3/2004 | Kadah ............... | H02M 7/53871 318/268 |
| 9,018,882 | B2 | 4/2015 | Mack et al. | |

(Continued)

*Primary Examiner* — David Luo
(74) *Attorney, Agent, or Firm* — Keeling Law, LLC; Kenneth A. Keeling; Mark S. Solomon

(57) ABSTRACT

Embodiments of a mixing device power system generally include a power control module, an AC motor, and a variable frequency drive, wherein upon application of AC power to the system, electrical power is provided to the power control module which transmits electrical power to the AC motor, whereby rotation of a mixing spindle is initiated. After the spindle has begun rotating, transmission of electrical power from the power control module to the AC motor is ceased, and substantially simultaneously electrical power transmission is commenced from the power control module to the variable frequency drive which transmits electrical power to the AC motor, whereby rotation of the mixing spindle is continued. A method of using the mixing device power system to mix a fluid sample is also provided.

8 Claims, 3 Drawing Sheets

Method 200

Mixer Provision Step 202

AC Power Provision Step 204

Spindle Rotation Commencement Step 206

Spindle Rotation Continuation Step 208

Spindle Rotation Control Step 210

(56) References Cited

U.S. PATENT DOCUMENTS 9,461,565 B2 * 10/2016 Osman .................... H02P 1/028
2017/0126164 A1 5/2017 Gibbs et al.

* cited by examiner

MIXING DEVICE POWER SYSTEM AND METHOD

CROSS-REFERENCE TO RELATED APPLICATIONS

This application claims the benefit of U.S. Provisional Application No. 62/618,798 filed on Jan. 18, 2018, which application is incorporated herein by reference as if reproduced in full below.

STATEMENT REGARDING FEDERALLY SPONSORED RESEARCH OR DEVELOPMENT

Not applicable.

BACKGROUND OF THE INVENTION

Field of the Invention

The present invention generally relates to an improved apparatus and method for mixing fluids, such as drilling fluids.

Description of the Related Art

In the drilling fluid industry, the American Petroleum Institute (API) has established strict guidelines for the mixing procedures of preparing a drilling fluid. One operational mixing parameter which is specified is the rotational speed of the mixing device spindle(s). In API Specification 13, the spindle rotational speed is specified to be 11,500 RPM±300 RPM.

Conventionally, the mixers used to prepare a drilling fluid are the same models as those used for food and beverage preparation in the restaurant industry. One such device is the Multi Mixer, available from Sterling Multi Products, Inc. of Prophetstown, Ill. The technical specifications of such mixers are not governed by any governmental unit or industry body, and the rotational speeds of these mixers can vary significantly, even among different production lots of a particular vendor's mixing device. These rotational speed variations can be problematic when attempting to mix drilling fluids in accordance with API procedures, where the specific spindle rotational speed is required.

Many of the commercially available mixing devices use high power, single phase, induction, alternating current (AC) motors. A unique feature of such motors is that their rotational speed is directly proportional to the frequency of the current which is used to power these motors. Thus, motor speed can be governed and controlled by varying the AC frequency. In some instances, a Variable-Frequency Drive (VFD) (also known as an adjustable-frequency drive, variable-voltage/variable-frequency (VVVF) drive, variable speed drive, AC drive, micro drive, or inverter drive) may be used to output a controlled frequency to an AC motor to rotate the mixing component at a specific rotational speed. Unfortunately, such VFD's used for single phase AC motor control cannot produce enough current to initiate rotational movement of the high-powered motors utilized in mixers commonly used to prepare drilling fluids.

It is an objective of the present invention to provide a mechanism for effectively utilizing a VFD to initiate and control rotation of a drilling fluid mixing device.

BRIEF SUMMARY OF THE INVENTION

Embodiments of the invention generally include an AC motor system that, when connected with a standard AC outlet, first directly supplies power to a spindle motor to provide rotational motion of a spindle, and then once the spindle has begun rotating, the AC motor system automatically ceases providing such direct power and diverts power to a variable frequency drive, which thereupon supplies power therefrom to the spindle motor to continue the rotational motion of the spindle in a rotationally speed-controlled manner.

Other features and advantages of the invention will be apparent from the following description, the accompanying drawings, and the appended claims.

DETAILED DESCRIPTION OF EXEMPLARY EMBODIMENTS OF THE INVENTION

Figure 1:
FIG. 1 is a depiction of a prior art mixer suitable for modification commensurate with an embodiment of the current invention.

The exemplary embodiments are best understood by referring to the drawings wherein like reference characters designate like or similar parts throughout. As used herein, relative direction terms such as "top," "bottom," "up," and "down" are used only for descriptive purposes in illustrating exemplary embodiments, and other geometries and/or orientations are contemplated.

FIG. 1 depicts an embodiment of a prior art mixer 2 that may be used to mix fluids, such as but not limited to, drilling fluids. Typically, mixer 2 comprises an AC motor (not shown) that provides rotational energy to one or more spindles 4, each of which may be equipped with one or more agitation components 6 disposed there along. In practice, each spindle 4 may be individually operable by placement of a fluid containing sample vessel (not shown) in a mixing position with the spindle 4 at least partially immersed in the fluid sample (not shown), whereby a start actuator 8 is engaged by the sample vessel to initiate power being supplied by the AC motor (not shown) to rotate that spindle 4.

Figure 2A:
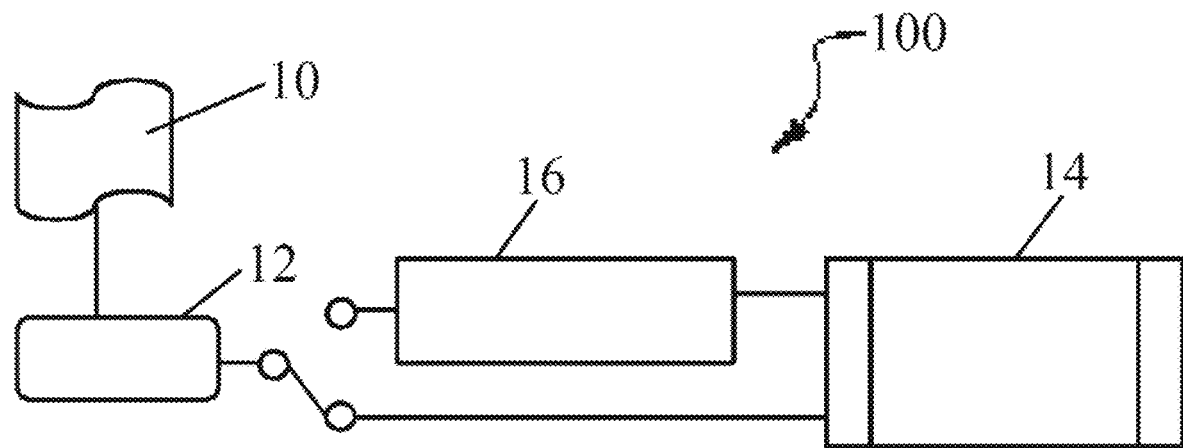
FIG. 2A is a depiction of a startup configuration of an embodiment of a power system of the present invention.
Figure 2B:
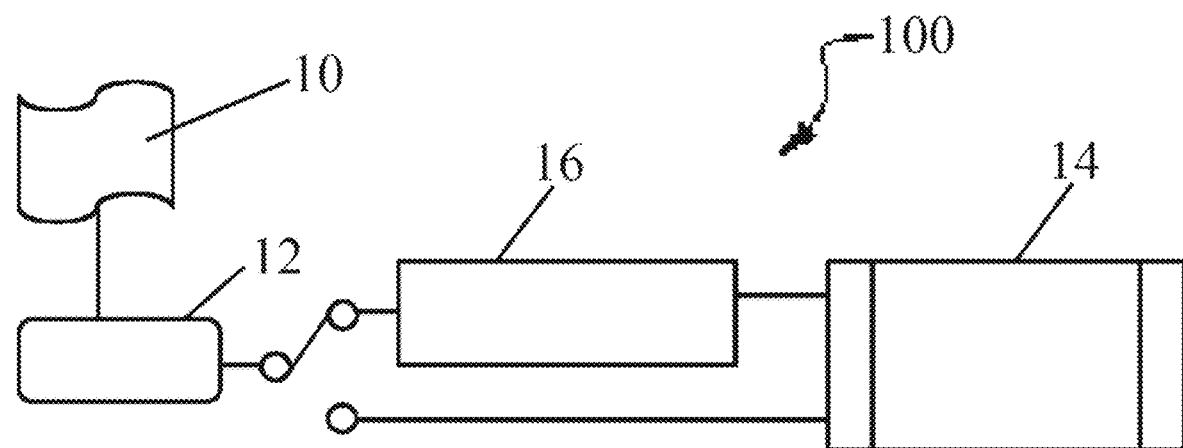
FIG. 2B is a depiction of post-startup configuration of an embodiment of a power system of the present invention.

One embodiment of the present invention is shown schematically in FIGS. 2A and 2B as power system 100. In one embodiment, a power system 100 comprises a power control module 12, an AC motor 14, and a VFD 16. As shown in FIG. 2A, an embodiment of the present invention allows for electrical connection between an AC power source (such as a standard 50 Hz wall outlet) 10 and power control module 12. In the embodiment depicted in FIGS. 2A and 2B, a power control module 12 is directly connected to AC power source 10, although other configurations are contemplated and such electrical connection may be indirect. In an initial (i.e., startup) configuration of an embodiment of power system 100, power control module 12 is electrically connected to AC motor 14. In one embodiment, AC motor 14 comprises an AC induction motor. In one embodiment, AC motor 14 is mechanically connected to one or more spindles 4 (not shown in FIG. 2A) whereby the spindle(s) 4 may be rotated. In one embodiment, AC motor 14 is adapted and configured to provide power to a drive mechanism (not shown) that rotates the spindle(s) 4.

In a second (i.e., post-startup) configuration of an embodiment of power system 100, power control module 12 is electrically connected to a VFD 16, which is electrically connected to AC motor 14. In one embodiment, VFD 16 provides rotational speed control of one or more spindles 4, as would be understood by one skilled in the art. In one embodiment, VFD 16 is programmable such that it can be utilized to control the rotational speed of rotating spindle(s) 4.

Although FIGS. 2A and 2B show power control module 12 electrically connected to only AC motor 14 and VFD 16, respectively, such depiction is merely for illustration purposes, and in various embodiments (not shown), power control module 12 may be electrically connected to both AC motor 14 and VFD 16, continuously or intermittently, wherein power control module 12 is adapted and configured to selectively transmit electrical power to either AC motor 14 or VFD 16. In addition, although FIG. 2A depicts direct electrical connection of power control module 12 to AC motor 14, the invention is not so limited and other components (not shown) may be electrically connectively disposed there in between.

In one embodiment, power control module 12 comprises a series of relays and electrical contactors. In one embodiment, power control module 12 comprises a microprocessor and a series of electrical contactors.

In one embodiment, AC motor 14 is an induction motor. In one embodiment, AC motor 14 is a single phase motor.

In one embodiment, the VFD 16 may convert the electrical power from a 50 Hz electrical signal to a 60 Hz electrical signal.

In one embodiment, a mixer 2 may be equipped with one or more power systems 100, each adapted and configured to control rotation of one or more spindles 4.

Operation

In one embodiment, operation of a power system 100 to mix of a fluid sample comprises connecting power system 100 to an AC power source 10. In one embodiment, actuation of mixer 2, such as by engagement of a fluid sample vessel (not shown) with a start actuator 8, results in the flow of electrical power to power control module 12. In a startup mode, power control module 12 transmits electrical power to AC motor 14, which provides (via a mechanical drive, not shown) for commencement of rotation of the spindle 4 associated with the actuated start actuator 8. After a specified amount of time, or upon fulfillment of some other criterion (such as, but not limited to, detection of rotational movement of spindle 4 utilizing, for example, a proximity switch), while spindle 4 is rotating, power control module 12 ceases transmitting power directly to AC motor 14, and substantially simultaneously commences transmitting electrical power to VFD 16. VFD 16 then transmits electrical power to AC motor to maintain rotation of spindle 4 and control the rotational speed thereof at a desired rate. In one embodiment, the time interval between cessation of power transmission from the power control module 12 to the AC motor 14, and commencement of power transmission from the VFD 16 to the AC motor 14 is about 0.3 seconds.

In one embodiment, the VFD 16 controls the rotational speed spindle 4 by outputting a desired frequency electrical power signal to AC motor 14. In one embodiment, the desired frequency electrical power signal comprises a 60 Hz electrical signal. In one embodiment, the rotational speed of the spindle is controlled at about 11,500 rpm±300 rpm. In one embodiment, when it is determined that the fluid sample has been sufficiently mixed, the spindle rotation is ceased, such as by disengagement of the sample vessel from the start actuator 8.

As would be understood by one skilled in the art, in one embodiment, while a first spindle 4 is being rotated (utilizing the VFD 16 to control the AC motor 14) to mix a first sample in a first sample vessel, a second sample-containing vessel may be engaged with a start actuator 8 associated with a second (non-rotating) spindle 4, whereby the second spindle 4 begins to rotate and under control of the VFD 16 continues rotation to mix the second sample.

Method

Figure 3:
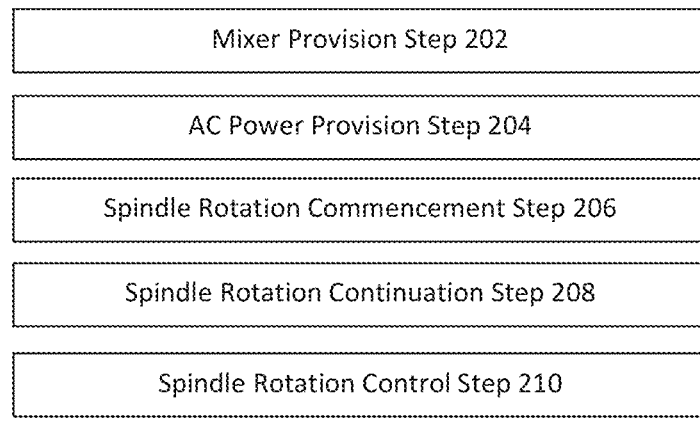
FIG. 3 lists exemplary steps of an embodiment of a mixer control method of the present invention.

In one embodiment, a method 200 of controlling mixer 2, as shown in FIG. 3, comprises the following steps.

A Mixer Provision Step 202, comprising providing a fluid sample mixer, such as mixer 2, wherein the mixer comprises a power control module, such as power control module 12, an AC motor, such as AC motor 14, and a VFD, such as VFD 16.

An AC power provision step 204, comprising supplying AC electrical power to the power control module.

A Spindle Rotation Commencement Step 206, comprising transmitting electrical power from the power control module to the AC motor, whereby the AC motor initiates rotate of a mixer spindle.

A Spindle Rotation Continuation Step 208, comprising ceasing the transmission of electrical power from the power control module to the AC motor, and substantially simultaneously commencing transmission of electrical power from the power control module to the VFD, which thereupon commences transmitting electrical power to the AC motor, thereby continuing rotation of the mixer spindle.

A Spindle Rotation Control Step 210, comprising utilizing the VFD to control the rotational speed of the mixer spindle.

As would be understood by one skilled in the art, method 200 is only exemplary, and may be modified to accomplish specific results, such modifications including, but not limited to, combining, adding, deleting, re-ordering, and/or repeating one or more steps. As would also be understood by one skilled in the art, while method 200 has been described as a plurality of steps, in various embodiments, two or more steps may be performed concurrently.

While the present invention has been disclosed and discussed in connection with the foregoing embodiments, it will be understood that the invention is not limited to the embodiments disclosed, but is capable of numerous rearrangements, modifications, and substitutions of parts and elements without departing from the spirit and scope of the invention.

We claim:

1. A method of for initiating and controlling the rotation of a mixer spindle, comprising:
   providing a mixer;
   wherein said mixer comprises:
   a start actuator;
   a power control module;
   an AC motor;
   a VFD; and
   one or more spindles;
   wherein;
   said power control module is electrically connectable to an AC power source;
   said power control module is alternatively electrically connected to one of said AC motor and said VFD;

said VFD is electrically connected to said AC motor;
when said power control module is electrically connected to said AC power source, actuation of said start actuator commences the flow of electrical power from said AC power source to said power control module;
upon receipt of electrical power from said AC power source, said power control module, which is initially electrically connected to said AC motor but not to said VFD, transmits electrical power to said AC motor, whereby said AC motor operates to initiate rotation of at least one said spindle; and
after said rotation of said at least one said spindle is initiated, said power control module is electrically disconnected from said AC motor and is electrically connected to said VFD, whereupon said power control module switches from electrical power transmission to said AC motor to electrical power transmission to said VFD, whereupon electrical power is transmitted from said VFD to said AC motor to continue said rotation of said at least one said spindle;
electrically connecting said power control module to said AC power source;
providing a vessel containing a fluid sample such that one said spindle is at least partially disposed within said fluid sample;
actuating said start actuator, whereby electrical power is transmitted from said power control module to said AC motor and said spindle at least partially disposed within said fluid sample begins rotating; and
ceasing electrical power transmission from said power control module to said AC motor and substantially simultaneously commencing electrical power transmission from said power control module to said VFD, whereby electrical power is transmitted from said VFD to said AC motor and said spindle at least partially disposed within said fluid sample continues rotating.

2. The method of claim 1, wherein said AC motor provides power to a drive mechanism that rotates at least one said spindle.

3. The method of claim 1, wherein said VFD provides rotational speed control of at least one said spindle.

4. The method of claim 1, wherein said VFD converts said electrical power from a 50 Hertz electrical signal to a 60 Hertz electrical signal.

5. A method of for initiating and controlling the rotation of a mixer spindle, comprising:
providing a mixer;
wherein said mixer comprises:
a start actuator;
a power control module;
an AC motor;
a VFD; and
one or more spindles;
wherein;
said power control module is electrically connectable to an AC power source;
said power control module is electrically connected to, continuously or intermittently, said AC motor and said VFD;
said VFD is electrically connected to said AC motor;
when said power control module is electrically connected to said AC power source, actuation of said start actuator commences the flow of electrical power from said AC power source to said power control module;
upon receipt of electrical power from said AC power source, said power control module transmits electrical power to said AC motor, whereby said AC motor operates to initiate rotation of at least one said spindle; and
after said rotation of said at least one said spindle is initiated, said power control module switches from electrical power transmission to said AC motor to electrical power transmission to said VFD, whereupon electrical power is transmitted from said VFD to said AC motor to continue said rotation of said at least one said spindle;
electrically connecting said power control module to said AC power source;
providing a vessel containing a fluid sample such that one said spindle is at least partially disposed within said fluid sample;
actuating said start actuator, whereby electrical power is transmitted from said power control module to said AC motor and said spindle at least partially disposed within said fluid sample begins rotating; and
ceasing electrical power transmission from said power control module to said AC motor and substantially simultaneously commencing electrical power transmission from said power control module to said VFD, whereby electrical power is transmitted from said VFD to said AC motor and said spindle at least partially disposed within said fluid sample continues rotating.

6. The method of claim 5, wherein said AC motor provides power to a drive mechanism that rotates at least one said spindle.

7. The method of claim 5, wherein said VFD provides rotational speed control of at least one said spindle.

8. The method of claim 5, wherein said VFD converts said electrical power from a 50 Hertz electrical signal to a 60 Hertz electrical signal.

* * * * *